United States Patent
Shiozawa et al.

(10) Patent No.: US 7,223,084 B2
(45) Date of Patent: May 29, 2007

(54) ELECTRIC MOTOR DRIVEN TOGGLE MOLD CLAMPING DEVICE

(75) Inventors: Fumio Shiozawa, Nagano-ken (JP); Keizou Shimizu, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 388 days.

(21) Appl. No.: 10/878,298

(22) Filed: Jun. 28, 2004

(65) Prior Publication Data

US 2004/0265418 A1 Dec. 30, 2004

(30) Foreign Application Priority Data

Jun. 30, 2003 (JP) ............................ 2003-188359

(51) Int. Cl.
*B29C 45/83* (2006.01)

(52) U.S. Cl. .................... 425/107; 425/451.6; 425/593

(58) Field of Classification Search ................ 425/107, 425/593, 451.6; 74/89.44
See application file for complete search history.

(56) References Cited

U.S. PATENT DOCUMENTS 2,403,092 A * 7/1946 Lear ........................... 74/89.44
3,508,300 A * 4/1970 Allard et al. ................ 425/593
6,711,963 B2 * 3/2004 Yabe .......................... 74/89.44
6,865,963 B2 * 3/2005 Takanohashi et al. ...... 74/89.44

FOREIGN PATENT DOCUMENTS

| JP | 3199363 | | 6/2001 |
| JP | 2001-248707 | * | 9/2001 |
| JP | 2003-083416 | | 3/2003 |

* cited by examiner

*Primary Examiner*—James P. Mackey
(74) *Attorney, Agent, or Firm*—Weingarten, Schurgin, Gagnebin & Lebovici LLP

(57) ABSTRACT

The purpose of the invention is to prevent a sticking of lubricant to a ball screw shaft and a scattering to the circumstance in an electromotive toggle mold clamping device.

This invention relates to the electric motor driven toggle mold clamping device wherein a ball nut member is screwed together to the ball screw shaft which rotates by an electric motor to advance and retreat freely and a cross head is fixed to the ball nut member, a cylindrical or polygonal cylindrical member which has a cylindrical body shape or square cylindrical body shape with a length and a size of placing the ball screw shaft with a required gap while retreating the cross head, is attached to the front ends of the cross head concentrically with the ball screw shaft. The ball screw shaft protruding from the cross head is placed in the cylindrical or polygonal cylindrical member having a required gap.

6 Claims, 4 Drawing Sheets

ELECTRIC MOTOR DRIVEN TOGGLE MOLD CLAMPING DEVICE

This application claims priority to a Japanese application No. 2003-188359 filed Jun. 30, 2003.

FIELD OF THE INVENTION

The present invention relates to an electric motor driven toggle mold clamping device where a ball nut member is screwed together to a ball screw shaft which rotates by an electric motor to advance and retreat freely, and a cross head which actuates a toggle link to extend and contract is fixed to the ball nut member.

BACKGROUND ART

According to the conventional an electric motor driven toggle mold clamping device, a scattering of a lubricant from a rotating ball nut member is prevented by covering a nut cover to a circumference of the ball nut member (JP2003-083416). Also, in another conventional device, the scattering of the grease mist from the rotating ball nut member is prevented by providing a cover plate to a toggle support (JP3199363).

SUMMARY OF THE INVENTION

Since the conventional device constitutes that the ball screw shaft moves to advance and retreat by a rotation of the ball nut member, the ball nut member is covered by the covering in order to prevent the scattering of the lubricant supplied to the ball nut member, but for a toggle mechanism which introduces a driving system of the ball nut member movement by rotating the ball screw shaft, the scattering of the lubricant from the ball screw shaft can not be prevented even if covering by a cover of the ball nut member.

Also, independently of the driving system, the problems arise and provide to be solved such that, since the ball screw shaft is positioned between toggle links, the lubricant such as grease, oil and the like supplied around pins of the toggle links of the upper side sticks to the ball screw shaft by dropping, so that not only dusts, abrasion fine grains and the like which contain in the lubricant cause troubles to the ball screw shaft, but also in case of rotating type ball screw shaft, a phenomenon that contaminates the inside of the device resulting from the scattering of the lubricant to the circumference by the rotation, can not be prevented.

The present invention is devised under such circumstances and the purpose is to provide the new electric motor driven toggle mold clamping device where by attaching the cylindrical or polygonal cylindrical member so as to cover the ball screw shaft to the cross head or the ball nut member, the prevention of the lubricant sticking to the ball screw shaft and the prevention of scattering to the circumference can be achieved and also the oil supply efficiency to the ball nut member can be conducted for improvement.

The present invention relates to an electric motor driven toggle mold clamping device comprising a ball screw shaft rotating by an electric motor, a ball nut member screwed together to the ball screw shaft to advance and retreat freely, and a cross head fixed to the ball nut member, wherein the electric motor driven toggle mold clamping device comprises that, a cylindrical or polygonal cylindrical member which has a cylindrical body shape or polygonal cylindrical body shape with a size capable of housing the ball screw shaft with a required gap while retreating the cross head, is attached to the front ends of the cross head concentrically with the ball screw shaft.

Furthermore, said cylindrical or polygonal cylindrical member is constituted by attaching to the front end of the cross head or the front end of the ball nut member and a gap between an inner wall surface of the cylindrical member of said cylindrical body shape and an outer peripheral surface of the ball screw shaft is set to be within 5.0 mm, or a gap at the closest portion between an inner wall surface of the polygonal cylindrical member of polygonal cylindrical body and an outer peripheral surface of the ball screw shaft is set to be within 5.0 mm.

DESCRIPTION OF THE PREFERRED EMBODIMENTS

Figure 1:
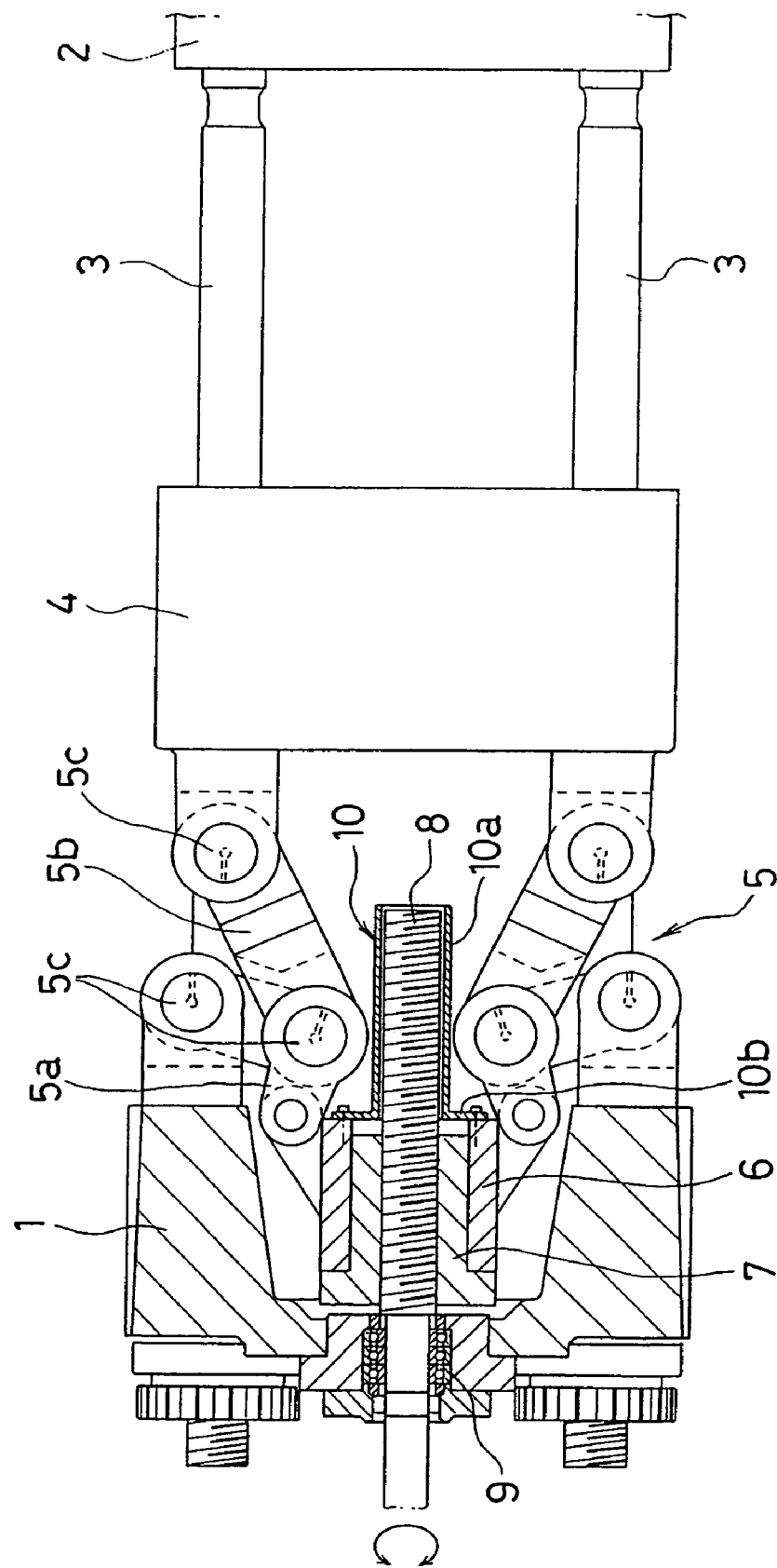
FIG. 1 shows a partial transverse side sectional view of the electric motor driven toggle mold device in the state of mold opening according to the present invention.
Figure 2:
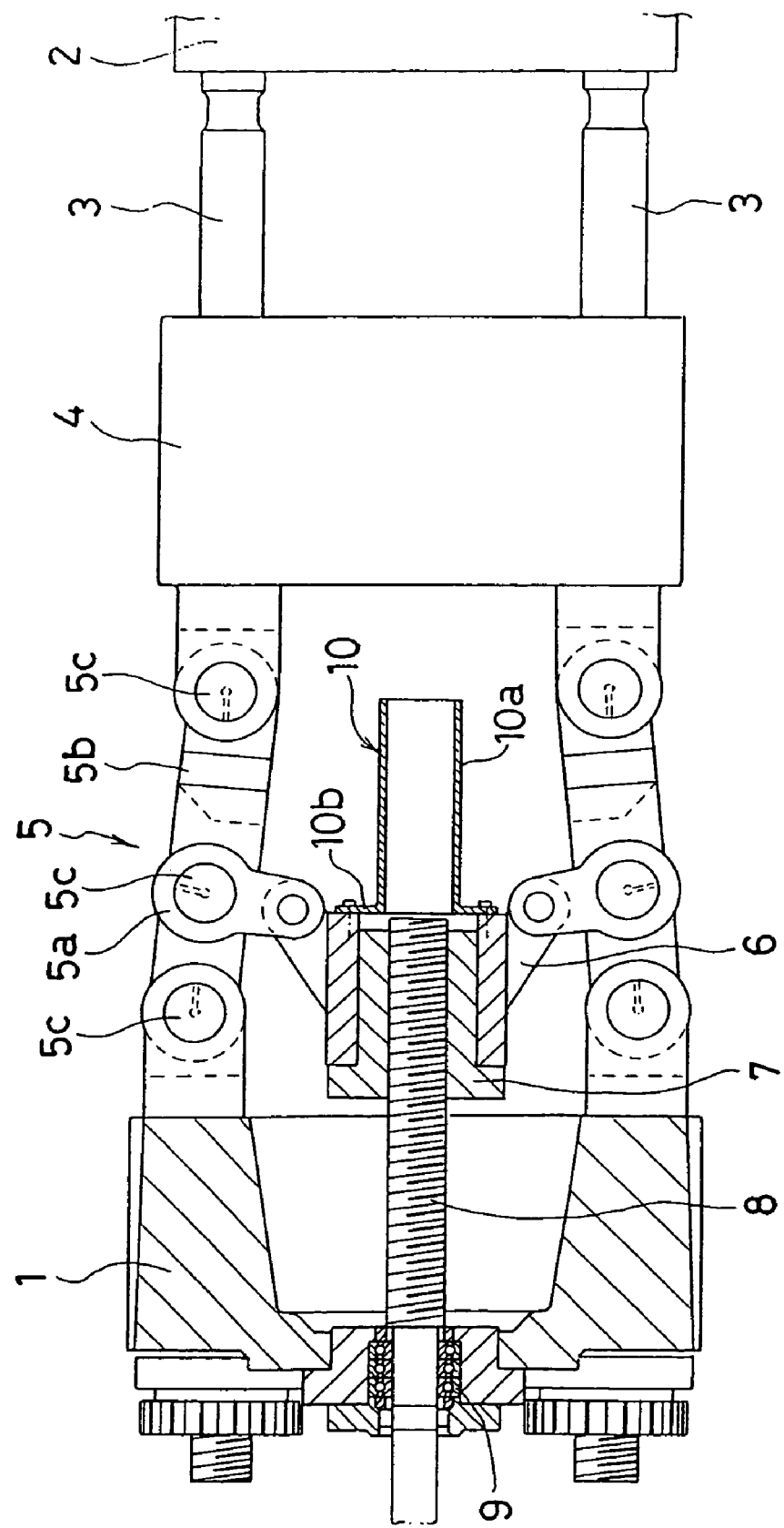
FIG. 2 shows a partial transverse side sectional view of the electric motor driven toggle mold device in the state of mold clamping according to the present invention.

A pressure receiving platen 1 and a stationary platen 2 are connected by tie bars 3,3 provided in every four-corner portion. A movable platen 4 is provided between the pressure receiving platen 1 and the stationary platen 2 by inserting through the tie bars 3,3 and is connected to the pressure receiving platen 1 by a toggle mechanism 5. In a cross head 6 at the center of the toggle mechanism 5, a ball nut member 7 is internally provided and in the pressure receiving platen 1, a ball screw shaft 8 is attached rotating freely through a bearing member 9.

The ball screw shaft 8 and the ball nut member 7 are mutually screwed together, and the cross head moves as a result that the rotary motion of the ball screw shaft 8 in place is converted to the linear motion by the ball nut member 7. By an expansion and contraction of an actuation link 5a and a toggle link 5b by the movement, the movable platen 4 moves to advance and retreat toward the stationary platen 2, and a mold (figure omitted) attached to the confronted side surface of the stationary platen 2 and the movable platen 4, is operated for the opening-closing and clamping.

In order to keep smooth actuation at the portion of a toggle pin 5c of the toggle mechanism, the lubricant is supplied timely based on the molding operating condition and the like. For said ball nut member 7 and the ball screw shaft 8, an appropriate quantity of the lubricant grease is supplied based on the predetermined time, the number of shots, or the like in order to conduct the smoothness of the advance/retreat movement and a long operating life.

A cylindrical member 10 which covers the ball screw shaft 8 is made from the metallic cylindrical body having an inner diameter larger than an outer diameter of the ball screw shaft 8 and a flange 10b is provided integrally to the one end of the cylindrical portion 10a. The cylindrical member 10 is attached by pinning up he flange 10b to the front end of said cross head 6 concentrically with said ball screw shaft 8 so as to cover the ball screw shaft, and is provided so as to move advance and retreat on the ball screw shaft together with the cross head 6. Furthermore, the cylindrical member 10 may possibly be attached to the cross head 6 by pinning up the flange 10b to the front end of said ball nut member 7 provided integrally with the cross head 6, as shown by the chain dash in FIG. 3 and FIG. 4.

By attaching said cylindrical member 10, the protruded portion through the cross head 6 of the ball screw shaft 8 becomes to be covered by the cylindrical member 10 at all the times. Accordingly, the dropping of the contaminated grease from a pin surrounding of the toggle mechanism 5 is eliminated to stick to the ball screw by blocking with the cylindrical member.

Figure 3:
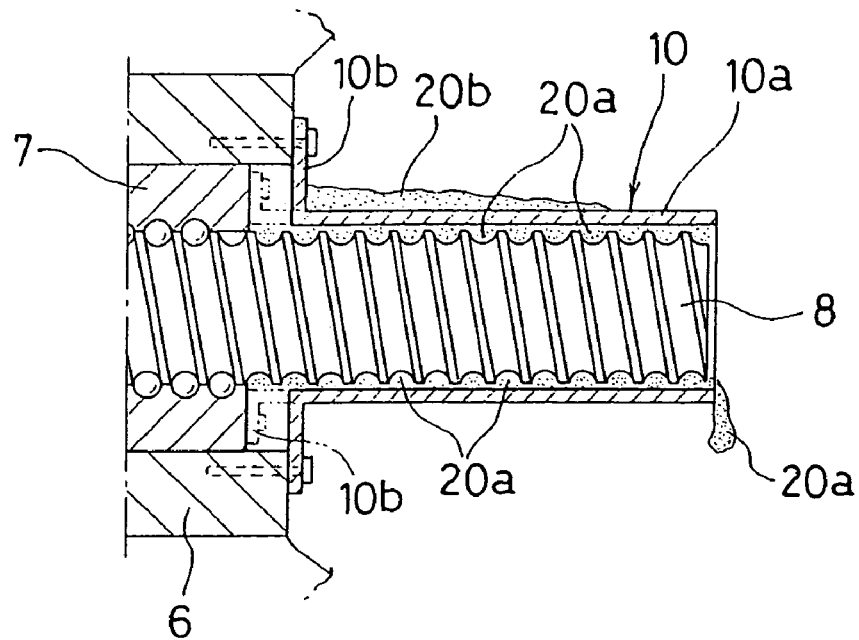
FIG. 3 shows a transverse side sectional view of the cross head portion in the state of mold opening.
Figure 4:
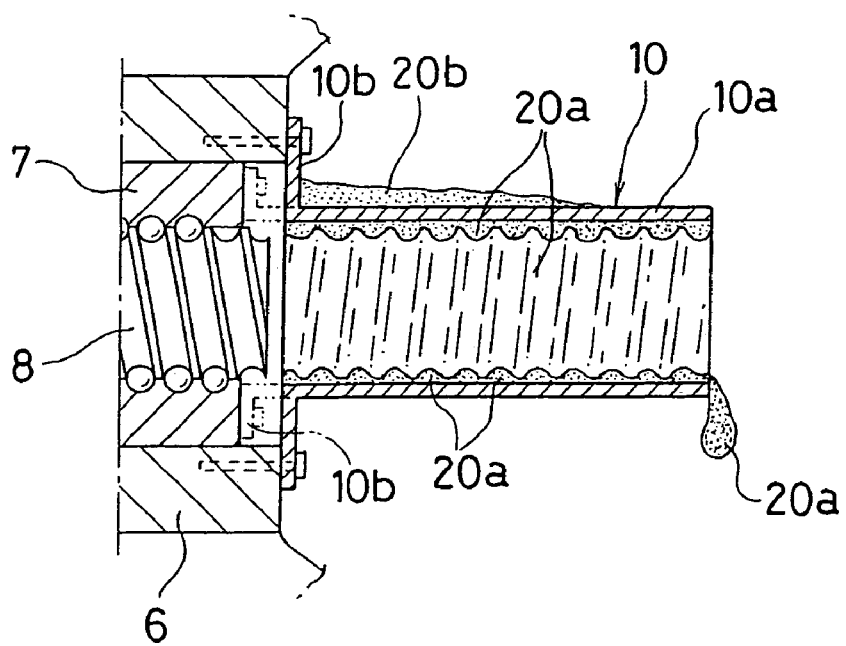
FIG. 4 shows a transverse side sectional view of the cross head portion in the state of mold clamping.

Also, since the cylindrical member 10 blocks the grease supplied to the ball nut member 7 from scattering by the rotation of the ball screw shaft, the diffusion of the grease mist into the device is eliminated. The gap between the outer peripheral surface of the ball screw shaft 8 and the inner wall surface of the cylindrical member 10 is preferable in the range not to exceed 5.0 mm As shown in FIG. 3 and FIG. 4, the grease 20a supplied to the ball nut member 7 sticks to the screw groove of the ball screw shaft 8. In case that no cylindrical member 10 is used, the stuck grease 20a scatters to the circumference by the centrifugal force generated by the rotation of the ball screw shaft together with the grease stuck to the ball screw shaft dropping from the toggle links, but if the cylindrical member 10 covers the ball screw shaft 8, the dropping grease 20b from the toggle links does not stick to the ball screw shaft 8, so that the grease 20a which sticks to the screw groove is limited only with the uncontaminated grease which is supplied to the ball nut member 7.

The stuck grease 20a comes to scatter by the centrifugal force and sticks by striking to the inner wall surface of the cylindrical member 10. The stuck grease generates spirally along with the screw groove and becomes a spiral stripe in the screw groove by the increase of the stuck layer as using, and the surplus grease discharges from the opening end of the cylindrical member 10.

Accordingly, the stuck grease generated on the inner wall surface of the cylindrical member 10 accumulates so as to screw together with the screw groove and as a result the ball screw shaft moves to advance and retreat smoothly, so that the quantity of the supply oil of the grease supplied to the ball nut member 7 can be conducted to the cut back. Such stuck and accumulated grease can be accomplished easily by setting the gap between the outer peripheral surface of the ball screw shaft 8 and the inner wall surface of the cylindrical member 10 to the range not to exceed 5.0 mm in one side. Furthermore, the length of the cylindrical member 10 is preferable to have the approximate length not to expose the top end of the ball screw shaft 8 in the mold opening state, but in some cases, even if the top end from the opening end of the cylindrical member exposes slightly, the scattering of the grease mist can be prevented.

Figure 5:
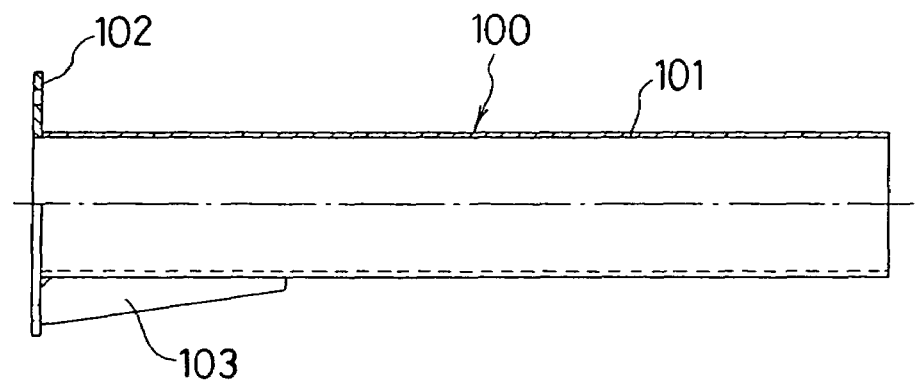
FIG. 5 shows a cross sectional view of the half portion of the polygonal cylindrical member by the square cylindrical body.
Figure 6:
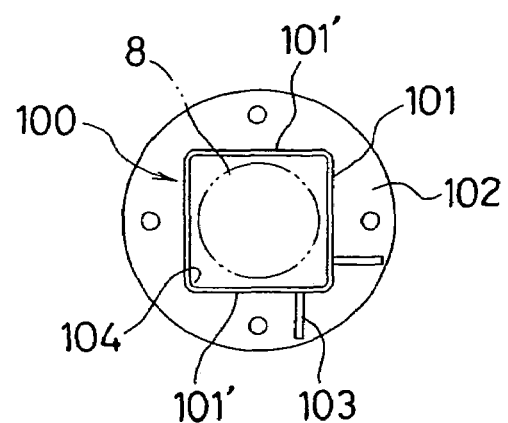
FIG. 6 shows a front view of the ball screw shaft shown by the chain dash according to the present invention.

FIG. 5 and FIG. 6 show the examples of using a polygonal cylindrical member 100 of the square cylindrical body as the cylindrical or polygonal cylindrical member. Said polygonal cylindrical member 100 comprises integrally a flange 102 at one end of the required length of the square cylindrical body 101 which covers the above mentioned ball screw shaft 8 and the flange 102 is pinned up, similarly in the case of the above mentioned cylindrical body as shown in FIG. 3, to the front ends of the cross head 6 or the ball nut member 7 and is provided movable around the circumference of the ball screw shaft 8 so as to advance and retreat together with the cross head 6. Such polygonal cylindrical member 100 can be prepared by welding to the one end of the flange for cutting an appropriate length of the ready-made metallic square type pipe and the like. The square cylindrical body 101 and the flange 102 become to withstand for a long operation life if the corners are reinforced by a reinforcing rib 103.

For the polygonal cylindrical member 100 by the square cylindrical body, partially a large gap to the ball screw shaft 8 is formed by corner portions 104 which are not existed in the cylindrical body. By the existence of the corner portions 104, the equivalent cutback efficiency of supply oil quantity such as the grease and the like as in the case of the cylindrical body is difficult to obtain, but if the gap at the closest between the inner wall surface 101'and the ball screw shaft 8 is set within 5.0 mm, as is obvious to the scattering prevention effect, the cutback efficiency of the supply oil quantity can also be obtained to a certain level.

Figure 7:
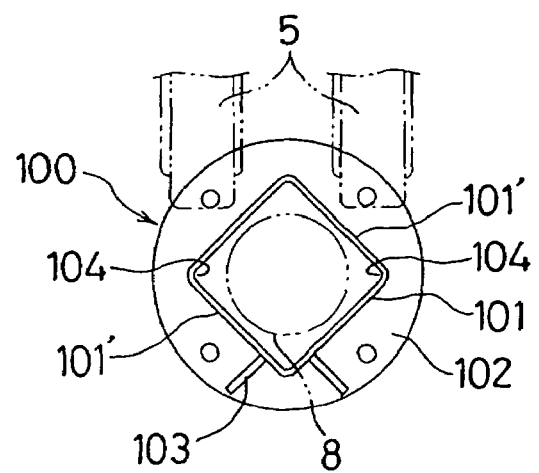
FIG. 7 shows one example of a front view of an attachment form of the polygonal cylindrical member by the square cylindrical body.

Moreover, depending on the kind of the clamping device, in some cases the gap between the toggle mechanism 5 and the ball screw shaft 8 is narrowly provided and by the extension and contraction actuation of the toggle mechanism, a touch of the link portion and the square cylindrical body to the polygonal cylindrical member 100 is concerned. For such case, at the pinning up of the polygonal cylindrical member 100 of the square cylindrical body shape, as shown in FIG. 7, by attaching the flat face 101' of the cylinder wall of the square cylindrical body 101 with a form so as to be arranged having the appropriate angle (45° in the figure) to the toggle mechanism 5, the problem of the undesirable touch and the like can be avoided. Also by such attachment form, the rigidity of the square cylindrical body 101 against the external load increases and the further attachment strength can be obtained.

What is claimed is:

1. An electric motor driven toggle mold clamping device comprising a ball screw shaft rotating by an electric motor, a ball nut member screwed together to the ball screw shaft to advance and retreat freely with rotation of the ball screw shaft, and a cross head fixed to the ball nut member, wherein the electric motor driven toggle mold clamping device comprises, a cylindrical or polygonal cylindrical member attached to the cross head and, which has a cylindrical or polygonal cylindrical body with a size capable of receiving the ball screw shaft with a gap maintained while advancing and retreating, the cylindrical or polygonal cylindrical member attached to a front portion of the cross head concentrically with the ball screw shaft, and grease disposed in the gap and said cylindrical or polygonal cylindrical member being provided with an opening communicating with said gap for discharging the grease from said opening.

2. The electric motor driven toggle mold clamping device according to claim 1, wherein said cylindrical or polygonal cylindrical member is attached to a front end of the ball nut member.

3. The electromotive toggle mold clamping device according to claim 1 wherein said gap between an inner wall surface of the cylindrical member and an outer peripheral surface of the ball screw shaft is set within 5.0 mm.

4. The electromotive toggle mold clamping device according to claim 1 wherein said gap at the closest portion between an inner wall surface of the polygonal cylindrical member and an outer peripheral surface of the ball screw shaft is set within 5.0 mm.

5. The electromotive toggle mold clamping device according to claim 2 wherein said gap between an inner wall surface of the cylindrical member and an outer peripheral surface of the ball screw shaft is set within 5.0 mm.

6. The electromotive toggle mold clamping device according to claim 2 wherein said gap at the closest portion between an inner wall surface of the polygonal cylindrical member and an outer peripheral surface of the ball screw shaft is set within 5.0 mm.

* * * * *